(12) United States Patent
Sampei et al.

(10) Patent No.: US 9,760,423 B2
(45) Date of Patent: Sep. 12, 2017

(54) STORAGE SYSTEM AND CONTROL APPARATUS

(71) Applicant: FUJITSU LIMITED, Kawasaki-shi, Kanagawa (JP)

(72) Inventors: Akira Sampei, Kawasaki (JP); Fumio Hanzawa, Yokohama (JP); Hiroaki Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 15/079,749

(22) Filed: Mar. 24, 2016

(65) Prior Publication Data

US 2016/0321122 A1 Nov. 3, 2016

(30) Foreign Application Priority Data

Apr. 30, 2015 (JP) .................................. 2015-093348

(51) Int. Cl.
*G06F 11/00* (2006.01)
*G06F 11/07* (2006.01)

(52) U.S. Cl.
CPC .......... *G06F 11/076* (2013.01); *G06F 11/079* (2013.01); *G06F 11/0727* (2013.01)

(58) Field of Classification Search
USPC ......................................................... 714/37
See application file for complete search history.

(56) References Cited

U.S. PATENT DOCUMENTS

| | | | |
|---|---|---|---|
| 2004/0205381 A1 | 10/2004 | Sakai | |
| 2007/0174719 A1 | 7/2007 | Inoue et al. | |
| 2007/0216395 A1* | 9/2007 | Kadner | G01R 17/14 324/76.77 |
| 2008/0288814 A1* | 11/2008 | Kitahara | G06F 11/073 714/5.1 |
| 2011/0191640 A1* | 8/2011 | Oh | G06F 12/00 714/54 |
| 2012/0254673 A1 | 10/2012 | Sampei et al. | |

FOREIGN PATENT DOCUMENTS

| | | |
|---|---|---|
| JP | H06-051915 A | 2/1994 |
| JP | 2004-252692 A | 9/2004 |
| JP | 2007-141185 A | 6/2007 |
| JP | 2012-208625 A | 10/2012 |

* cited by examiner

*Primary Examiner* — Sarai Butler
(74) *Attorney, Agent, or Firm* — Fujitsu Patent Center

(57) ABSTRACT

A first control device includes a first storage unit holding a first error count and a first control unit that calculates the first error count, based on a status of an error detected when a storage device is accessed via a second control device, stores the calculated first error count in the first storage unit, and transmits the first error count to the second control device at predetermined timing. The second control device includes a second storage unit holding a second error count and a second control unit that calculates the second error count, based on a status of an error detected when the storage device is accessed, stores the calculated second error count in the second storage unit, and determines whether the storage device has malfunctioned, based on an aggregate value of the first error count received from the first control device and the second error count.

6 Claims, 13 Drawing Sheets

| RAID GROUP | MEMBER DISK | STATUS | RAID-CONTROL CM | DA-CONTROL CM | AGGREGATION CM |
|---|---|---|---|---|---|
| RLU#0 | DISK#0000 | true | CM#2 | CM#0 | CM#0 |
| RLU#0 | DISK#1000 | true | CM#2 | CM#1 | CM#1 |
| ... | ... | ... | ... | ... | ... |

114a RAID MANAGEMENT TABLE

FIG. 7

114b ERROR MANAGEMENT TABLE

| DISK NUMBER | ERROR COUNT | FORWARDING THRESHOLD | CM HAVING DETECTED ERROR |
|---|---|---|---|
| DISK#0000 | 50 | 0 | CM#0, CM#2 |
| DISK#1000 | 0 | 0 | – |
| ... | ... | ... | ... |

FIG. 8

114c AGGREGATION TABLE

| DISK NUMBER | CUMULATIVE ERROR COUNT | CUT-OFF THRESHOLD |
|---|---|---|
| DISK#0000 | 100 | 256 |
| DISK#0001 | 0 | 256 |
| ... | ... | ... |

STORAGE SYSTEM AND CONTROL APPARATUS

CROSS-REFERENCE TO RELATED APPLICATION

This application is based upon and claims the benefit of priority of the prior Japanese Patent Application No. 2015-093348, filed on Apr. 30, 2015, the entire contents of which are incorporated herein by reference.

FIELD

The embodiments discussed herein relate to a storage system and a control apparatus.

BACKGROUND

There are control devices that control access to storage devices such as hard disk drives (HDDs). Such a control device monitors access errors that occur when accessing the storage devices. When an access error occurs, the control device holds the error occurrence status as an error count based on the content of the error. If the error count reaches a certain value, the control device determines that the corresponding storage device has malfunctioned and addresses the problem, for example, by cutting off the storage device.

The following storage system has been proposed as an example of a storage system having a function of monitoring failures of storage devices. In this storage system, when a connection control unit that connects a communication control unit and a plurality of storage devices finds a failure in accessing one of the storage devices, the connection control unit transmits an error report to the communication control unit. On the basis of the error report, the communication control unit determines whether to perform failure recovery processing.

In addition, for example, the following disk array has also been proposed. In this proposal, each of the disk devices constituting the disk array collects and holds its own operation history information and forwards this operation history information to a higher-level control device in response to a forwarding request therefrom.

See, for example, the following documents:
Japanese Laid-open Patent Publication No. 2007-141185
Japanese Laid-open Patent Publication No. 6-51915

As recent storage systems include more control devices that control access to storage devices, the scale of an individual storage system is increasing. In addition, the increase of the scale has created demands for more diversified access paths and access control systems. For example, there has been considered a technique for allowing a control device to access a storage device via another control device. However, with such a configuration, an error caused by accessing a single storage device could be detected by a plurality of control devices. If each of the control devices individually determines failures of storage devices, a failure per storage device cannot be adequately detected.

SUMMARY

According to one aspect, there is provided a storage system including: a storage apparatus; a first control apparatus; and a second control apparatus, wherein the first control apparatus includes: a first memory configured to hold a first error count; and a first processor configured to calculate the first error count, based on a status of an error detected when the storage apparatus is accessed via the second control apparatus, store the calculated first error count in the first memory, and transmit the first error count to the second control apparatus at predetermined timing, and wherein the second control apparatus includes: a second memory configured to hold a second error count; and a second processor configured to calculate the second error count, based on a status of an error detected when the storage apparatus is accessed, store the calculated second error count in the second memory, and determine whether the storage apparatus has malfunctioned, based on an aggregate value of the first error count received from the first control apparatus and the second error count.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a configuration of a RAID management table;

FIG. 8 illustrates an example of a configuration of an error management table;

DESCRIPTION OF EMBODIMENTS

Figure 1:
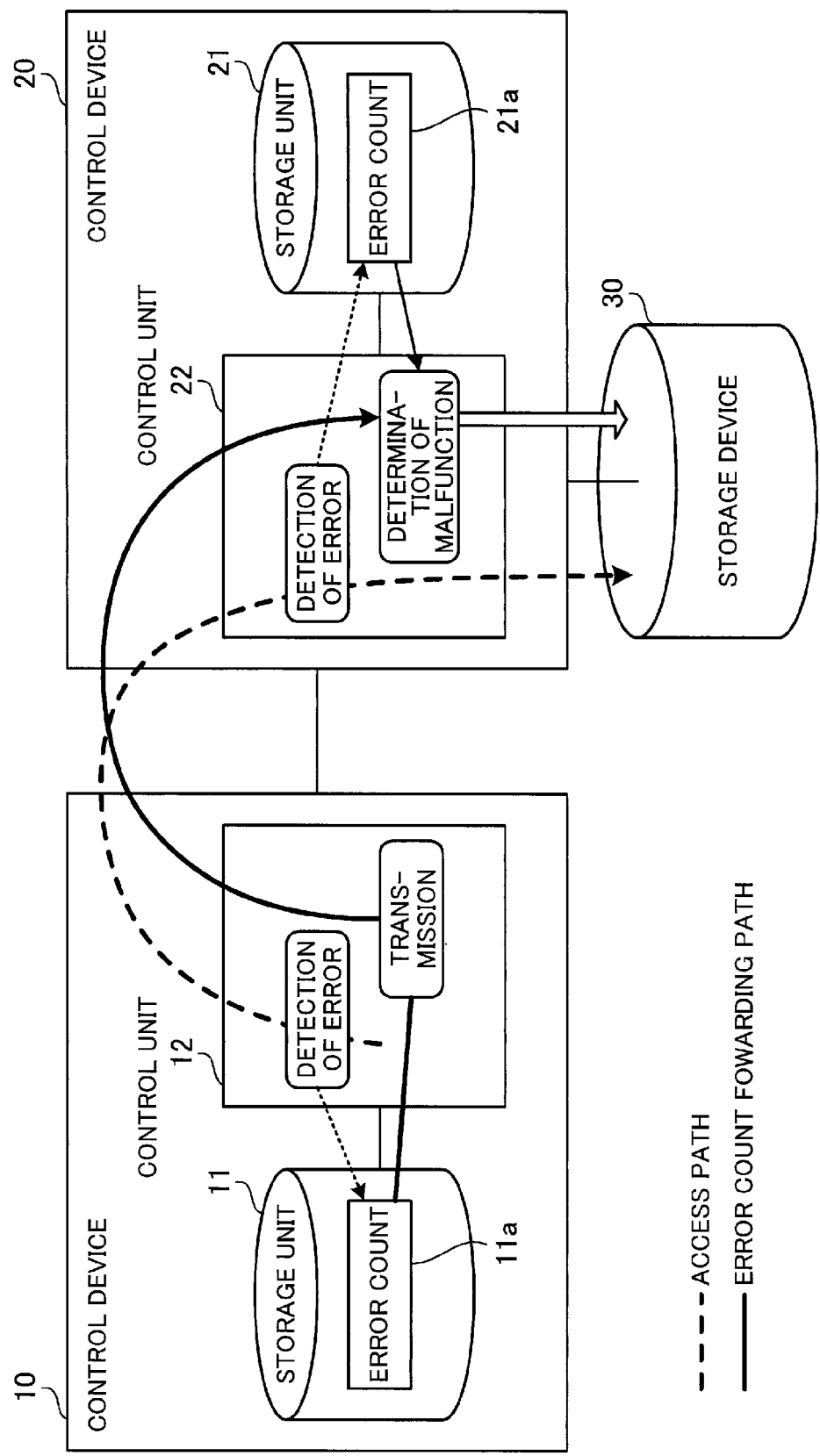
FIG. 1 illustrates an example of a configuration of a storage system according to a first embodiment and an example of processing performed by the storage system.

Embodiments will be described below with reference to the accompanying drawings, wherein like reference numerals refer to like elements throughout.

First Embodiment

FIG. 1 illustrates an example of a configuration of a storage system according to a first embodiment and an example of processing performed by the storage system. The storage system illustrated in FIG. 1 includes control devices 10 and 20 and a storage device 30. The control device 20 accesses the storage device 30. The control device 10 accesses the storage device 30 via the control device 20. For example, the control device 10 accesses the storage device 30 by transmitting a request for accessing the storage device 30 to the control device 20. In FIG. 1, the access path from the control device 10 to the storage device 30 is indicated by a dashed line.

With this configuration, an error that occurs when the storage device 30 is accessed is detected by both of the control devices 10 and 20. For example, the control device 10 can detect a read error when reading data stored in the storage device 30. For example, in addition to this read error, the control device 20 can also detect a spin-up error of the storage device 30 (if the storage device 30 is an HDD) and a media error of the storage device 30.

The control device 10 manages the errors that occur when accessing the storage device 30 by using an error count 11a. The control device 20 manages the errors that occur when accessing the storage device 30 by using an error count 21a. The error counts 11a and 12a are used for determining whether the storage device 30 has malfunctioned. Thus, either the control device 10 or 20 needs to aggregate the error counts 11a and 21a and determine whether the storage device 30 has malfunctioned on the basis of the aggregation result. In the present embodiment, the control device 20 aggregates the error counts and determines whether a malfunction has occurred.

The control device 10 includes a storage unit 11 and a control unit 12. For example, the storage unit 11 is a storage device such as a random access memory (RAM) or an HDD. For example, the control unit 12 is a processor. In this case, the control unit 12 performs its processing in accordance with a predetermined program.

The storage unit 11 holds the above error count 11a. On the basis of the status of an error detected when the storage device 10 accesses the storage device 30 via the control device 20, the control unit 12 increases or decreases the error count 11a stored in the storage unit 11. For example, the control unit 12 increments the error count 11a by a value corresponding to a detected error.

In addition, the control unit 12 transmits the error count 11a in the storage unit 11 to the control device 20 at predetermined timing. For example, the control unit 12 transmits the error count 11a to the control device 20 each time the error count 11a is updated. Alternatively, the control unit 12 may transmit the error count 11a to the control device 20 at certain time intervals. The control unit 12 may transmit the error count 11a to the control device 20 when the error count 11a increases or decreases by a predetermined value.

The control device 20 includes a storage unit 21 and a control unit 22. For example, the storage unit 21 is a storage device such as a RAM or an HDD. For example, the control unit 22 is a processor. In this case, the control unit 22 performs its processing in accordance with a predetermined program.

The storage unit 21 holds the above error count 21a. On the basis of the status of an error detected when the control device 20 accesses the storage device 30, the control unit 22 increases or decreases the error count 21a stored in the storage unit 21. For example, the control unit 22 increments the error count 21a by a value corresponding to a detected error. In addition, on the basis of the aggregate value of the error count 11a received from the control device 10 and the error count 21a stored in the control unit 21, the control unit 22 determines whether the storage device 30 has malfunctioned.

With the above configuration, the control device 20 comprehensively manages the storage device 30, which is accessed by both the control devices 10 and 20. Thus, whether the storage device 30 has malfunctioned is accurately determined.

In addition, for example, if the control device 10 transmits the error count 11a to the control device 20 each time the error count 11a is updated or the error count 11a is increased or decreased by a predetermined number, the error count is transmitted less frequently, compared with a case in which the control device 10 comprehensively manages the storage device 30. This is due to the following reason.

It is more likely that the control device 20 detects errors more frequently than the control device 10. This is because the control device 20, which is located closer to the storage device 30, is able to detect more kinds of errors. Thus, in the present embodiment, as described above, the control device 20 is configured to aggregate the error counts 11a and 21a and determine whether the storage device 30 has malfunctioned on the basis of the aggregation result. In this way, compared with a case in which the control device 10 performs the aggregation and malfunction determination, error counts are less frequently transmitted between the control devices 10 and 20. Thus, the traffic on the transmission lines between the control devices 10 and 20 is reduced.

Second Embodiment

Figure 2:
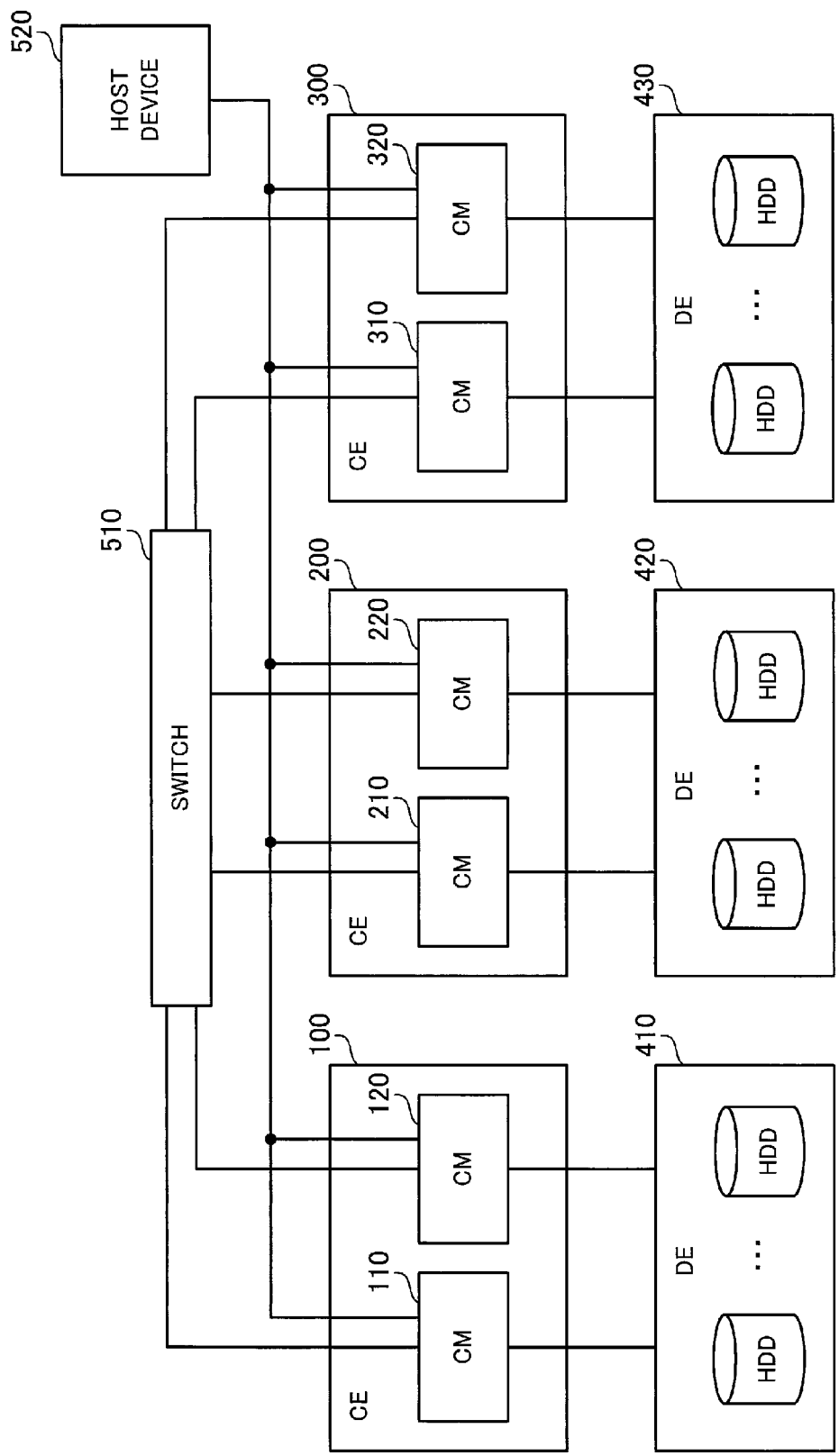
FIG. 2 illustrates an example of a configuration of a storage system according to a second embodiment.

FIG. 2 illustrates an example of a configuration of a storage system according to a second embodiment. The storage system illustrated in FIG. 2 includes controller enclosures (CEs) 100, 200, and 300, device enclosures (DEs) 410, 420, and 430, a switch 510, and a host device 520.

The CE 100 includes controller modules (CMs) 110 and 120. The CE 200 includes controller modules (CMs) 210 and 220. The CE 300 includes controller modules (CMs) 310 and 320. The CMs 110, 120, 210, 220, 310, and 320 are connected with each other via the switch 510. For example, each of the CMs 110, 120, 210, 220, 310, and 320 is connected to the switch 510 via a Peripheral Component Interconnect (PCI) Express bus.

In addition, the host device 520 is connected to each of the CMs 110, 120, 210, 220, 310, and 320. For example, the host device 520 is connected to each of the CMs 110, 120, 210, 220, 310, and 320 via a storage area network (SAN) using Fibre Channel (FC) or Internet Small Computer System Interface (iSCSI). In the example in FIG. 2, the single host device 520 is connected to each of the CMs 110, 120, 210, 220, 310, and 320. However, for example, the storage system may include a plurality of host devices, and each of the plurality of host devices may be connected to at least one CM.

Each of the DEs 410, 420, and 430 includes a plurality of storage devices. In the present embodiment, the DEs 410, 420, and 430 are disk array apparatuses each of which includes HDDs as storage devices. Alternatively, the DEs 410, 420, and 430 may be include a different type of storage devices such as solid state drives (SSDs).

The DE 410 is connected to the CMs 110 and 120. In response to a request from the host device 520 or any of the other CMs, the CMs 110 and 120 control access to the HDDs included in the DE 410. The DE 420 is connected to the CMs 210 and 220. In response to a request from the host device 520 or any of the other CMs, the CMs 210 and 220 control access to the HDDs included in the DE 420. The DE 430 is connected to the CMs 310 and 320. In response to a request from the host device 520 or any of the other CMs, the CMs 310 and 320 control access to the HDDs included in the DE 430.

For example, the CE 100 and the DE 410 are realized as a storage apparatus accommodated in a single enclosure. The pair of the CE 200 and the DE 420 and the pair of the CE 300 and the DE 430 are also realized as storage apparatuses, respectively, in a like manner. The storage system in FIG. 2 is configured by these storage apparatuses. In addition, the number of storage apparatuses may be increased (scale out).

For example, while the storage system in FIG. 2 includes three CEs each of which includes two CMs, the storage system may include a different number of CEs and CMs. For example, the storage system may include 12 CEs each of which includes two CMs. However, irrespective of the number of CEs and the number of CMs in each of the CEs, each of the CEs is connected to a DE.

In addition, a management terminal used by an administrator to perform setting and maintenance of the CMs 110, 120, 210, 220, 310, and 320 may be connected to the CMs 110, 120, 210, 220, 310, and 320.

Figure 3:
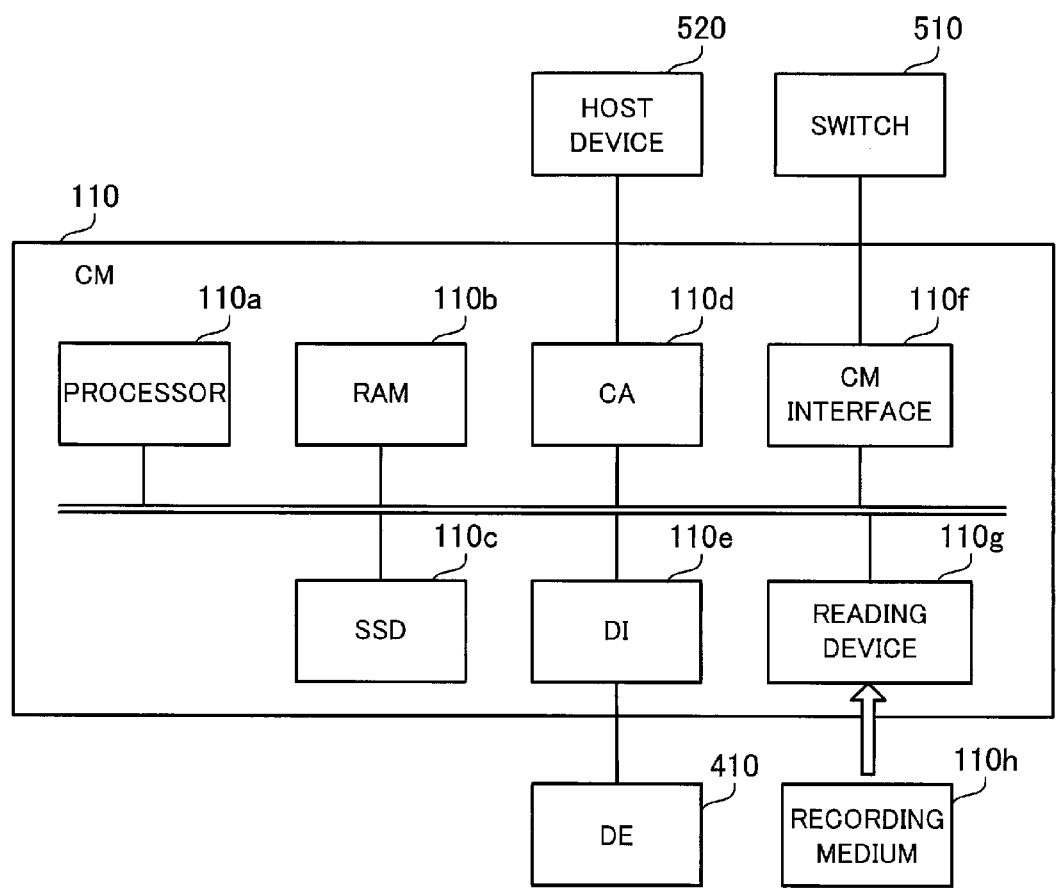
FIG. 3 illustrates an example of a hardware configuration of a control module (CM)

FIG. 3 illustrates an example of a hardware configuration of a CM. Since the CMs 110, 120, 210, 220, 310, and 320 are realized by the same hardware configuration, the hardware configuration of the CM 110 will be described below as an example.

The CM 110 is comprehensively controlled by a processor 110*a*. The processor 110*a* may be a multiprocessor. For example, the processor 110*a* is a central processing unit (CPU), a micro processing unit (MPU), a digital signal processor (DSP), an application specific integrated circuit (ASIC), or a programmable logic device (PLD). The processor 110*a* may be a combination of at least two of a CPU, an MPU, a DSP, an ASIC, and a PLD.

A RAM 110*b* and a plurality of peripheral devices are connected to the processor 110*a* via a bus.

The RAM 110*b* is used as a main storage device of the CM 110. At least a part of an operating system (OS) program or an application program executed by the processor 110*a* is temporarily stored in the RAM 110*b*. In addition, various types of data needed for processing by the processor 110*a* is stored in the RAM 110*b*.

Examples of the peripheral devices connected to the bus include an SSD 110*c*, a channel adapter (CA) 110*d*, a drive interface (DI) 110*e*, a CM interface 110*f*, and a reading device 110*g*.

The SSD 110*c* is used as an auxiliary storage device of the CM 110. OS programs, application programs, and various types of data are stored in the SSD 110*c*. A different type of non-volatile storage device such as an HDD may be used as the auxiliary storage device.

The CA 110*d* is an interface for communicating with the host device 520. The DI 110*e* is an interface for communicating with a DE 410. The CM interface 110*f* is an interface for communicating with the other CMs 120, 210, 220, 310, and 320 via the switch 510. The DI 110*e* is, for example, a serial attached SCSI (SAS) interface and has a function of transmitting a SCSI command to an HDD in the DE 410 in response to an instruction from the processor 110*a*.

A portable recording medium 110*h* is attached to or detached from the reading device 110*g*. The reading device 110*g* reads data recorded on the reading medium 110*h* and transmits the read data to the processor 110*a*. Examples of the recording medium 110*h* include an optical disc, a magneto-optical disk, and a semiconductor memory.

Figure 4:
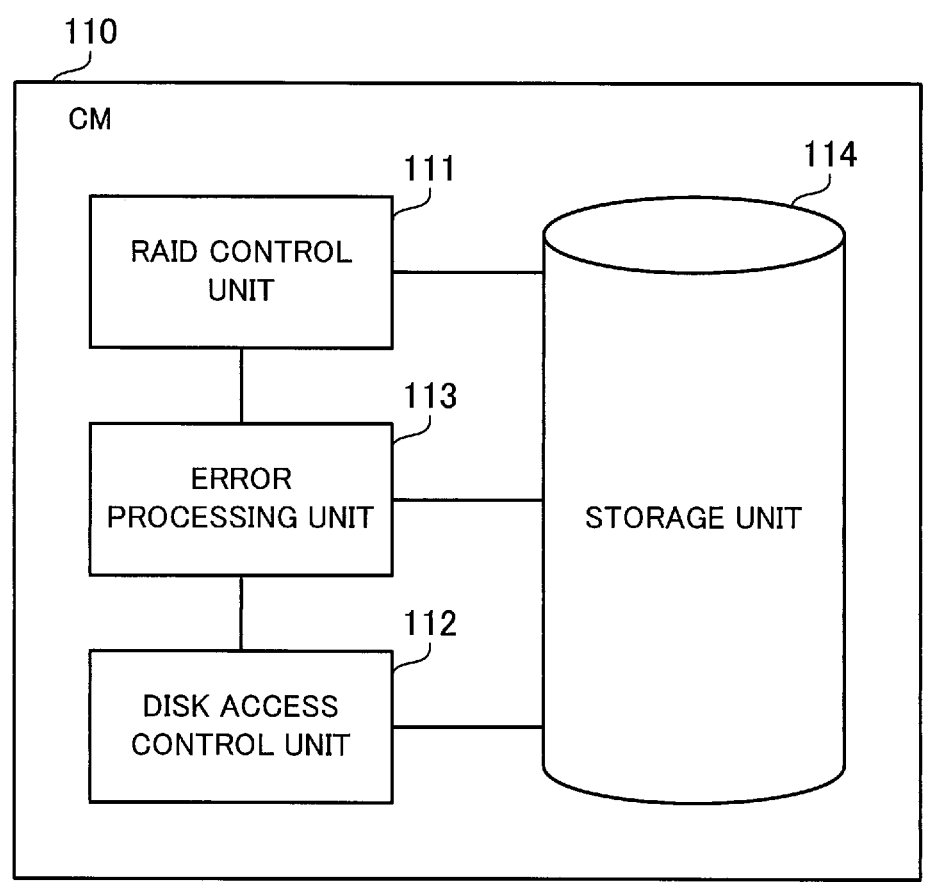
FIG. 4 is a block diagram illustrating an example of a configuration of processing functions of the CM.

FIG. 4 is a block diagram illustrating an example of a configuration of processing functions of the CM. Since all the CMs 110, 120, 210, 220, 310, and 320 have the same processing functions, the processing functions of the CM 110 will be described below as an example.

The CM 110 includes a RAID control unit 111, a disk access control unit 112, an error processing unit 113, and a storage unit 114. For example, processing performed by the RAID control unit 111, the disk access control unit 112, and the error processing unit 113 is realized by causing the processor 110*a* included in the CM 110 to execute a predetermined program. For example, the storage unit 114 is implemented as a storage area in the storage device such as the RAM 110*b* or the SSD 110*c* included in the CM 110.

The RAID control unit 111 controls access to a logical volume that is set to a RAID group. A RAID group is a logical storage area that is realized by a plurality of HDDs. In a logical storage area, identical data is recorded in two or more HDDs so that redundant data is ensured. A logical volume is a logical storage area recognized by the host device 520 as a single volume, and at least one logical volume is set to each RAID group.

The RAID control unit 111 receives a request for accessing a logical volume from the host device 520. The RAID control unit 111 requests access to an HDD(s) that constitutes a physical storage area(s) of the logical volume requested to be accessed by the host device 520. The RAID control unit 111 performs access control depending on the RAID level.

For example, when receiving a write request to write data in a RAID-1 logical volume, the RAID control unit 111 performs a control operation so that the data is written in two HDDs. In addition, when receiving a read request to read data from the logical volume, the RAID control unit 111 performs a control operation so that the data is read from one of the two HDDs.

As another example, when receiving a write request to write data in a RAID-5 logical volume, the RAID control unit 111 performs a control operation so that the write data is divided into a predetermined number, parity information based on the divided data is calculated, and the divided data and the parity information is recorded separately in a plurality of HDDs. In addition, when receiving a read request to read data from the logical volume, the RAID control unit 111 performs a control operation so that the divided data is read from the plurality of HDDs.

The physical storage area(s) of a logical volume which the RAID control unit 111 is requested to access may be an HDD(s) in the DE 410 connected to the CM 110 or an HDD(s) in the DE 420 or 430 connected to a different CM. In the former case, the RAID control unit 111 requests the disk access control unit 112 in the CM 110 to access the HDD(s) in the DE 410, which is the physical storage area(s) of the logical volume. In the latter case, the RAID control unit 111 requests the disk access control unit in the different CM connected to the DE including the HDD(s), which is the physical storage area(s) of the logical volume, to access the HDD(s). In the latter case, the access request is transmitted to the disk access control unit in the other CM via the switch 510.

In response to an access request from the RAID control unit 111 in the CM 110 or a RAID control unit in a different CM, the disk access control unit 112 accesses an HDD(s) in the DE 410 connected to the CM 110 via the DI 110*e*. The disk access control unit 112 accesses the HDD(s) by transmitting a SCSI command from the DI 110*e* to the HDD(s).

As described above, the access control performed by the CM 110 is broadly classified into "RAID control" performed by the RAID control 111 for controlling access to a logical volume and "disk access control" performed by the disk access control unit 112 for controlling access to the physical storage area(s) constituting the logical volume. In addition, two different CMs perform the RAID control and the disk access control on a certain logical volume, respectively. In other words, one CM performs the RAID control on a certain logical volume while another CM performs the disk access control on the same logical volume. This feature will be described below with reference to FIG. 5.

When the RAID control unit 111 requests access to an HDD in a DE connected to a different CM or when the disk access control unit 112 requests access to an HDD in the DE 410, if the error processing unit 113 detects an error, the error processing unit 113 increments the error count corresponding to the HDD. The storage unit 114 holds an error count per access destination HDD. The error processing unit 113 increments the error count corresponding to the HDD from which an error has been detected by a value corresponding to the content of the detected error.

In addition, on the basis of the error count, the error processing unit 113 cuts off the HDD corresponding to the error count. However, in the case of a logical volume on which one CM performs the RAID control (such a CM will hereinafter be referred to as a "RAID-control CM") and another CM performs the disk access control (such a CM will hereinafter be referred to as a "DA-control CM"), both of the CMs could detect errors when the HDD(s) allocated to the logical volume is accessed. To address this issue, the error processing unit 113 causes the DA-control CM to aggregate the error counts and perform the HDD cut-off control based on the aggregate error counts. The processing performed by the error processing unit 113 will be described in detail below.

The storage unit 114 holds various kinds of information needed for processing performed by the RAID control unit 111, the disk access control unit 112, and the error processing unit 113. For example, the storage unit 114 holds information about an error count per HDD, setting information about configurations of RAID groups, information about RAID-control CMs and DA-control CMs per HDD, and HDD cut-off determination information.

Figure 5:
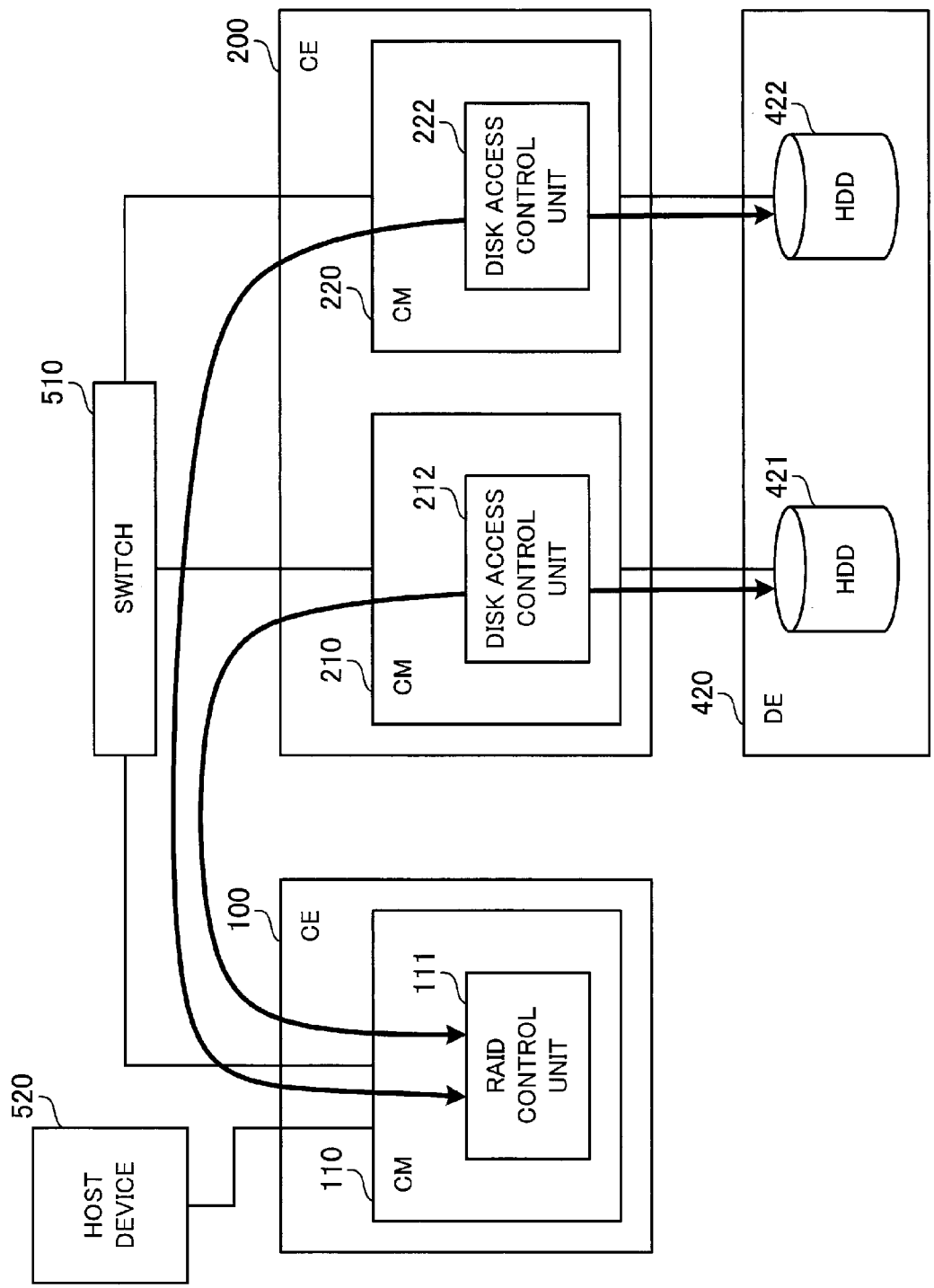
FIG. 5 illustrates an example of a case in which RAID control and disk access control are performed by different CMs.

FIG. 5 illustrates an example of a case in which RAID control and disk access control are performed by different CMs. In the example in FIG. 5, the physical storage areas of a logical volume on which the CM 110 performs the RAID control are HDDs 421 and 422 included in DE 420. This logical volume is controlled based on RAID-1. Namely, when the host device 520 requests to write data in this logical volume, the data is duplicated and written in both of the HDDs 421 and 422.

In addition, in the example in FIG. 5, the CMs 210 and 220 perform the disk access control on the HDDs 421 and 422, respectively. In the present embodiment, as in the example in FIG. 5, different CMs perform the disk access control on their respective HDDs that constitute the physical storage areas of a logical volume. The CM 210 includes a disk access control unit 212 that performs the disk access control on the HDD 421, and the CM 220 includes a disk access unit 222 that performs the disk access control on the HDD 422.

When receiving a write request to write data in the logical volume from the host device 520, the RAID control unit 111 requests the disk access control unit 212 in the CM 210 to write the data in the HDD 421. In addition, the RAID control unit 111 requests the disk access control unit 222 in the CM 220 to write the data in the HDD 422. In response to the requests from the RAID control unit 111, the disk access control units 212 and 222 write the data to the HDDs 421 and 422, respectively.

When receiving a read request to read data from the logical volume from the host device 520, the RAID control unit 111 requests the disk access control unit 212 or 222 to read the data. For example, if the RAID control unit 111 transmits a read request to the disk access control unit 212, the disk access control unit 212 reads the corresponding data from the HDD 421 and transmits the read data to the RAID control unit 111.

As in the above example in FIG. 5, by causing one CM to perform the RAID control and another CM to perform the disk access control on a certain logical volume, the degree of freedom in allocating HDDs to an individual logical volume is increased. Thus, the HDDs are efficiently used. In addition, since different CMs perform disk access control on the respective HDDs that constitute the physical storage areas of a logical volume, even if a malfunction occurs in any of the CMs, the possibility that data in the logical volume cannot be accessed is reduced. Thus, the fault tolerance is increased.

In the example in FIG. 5, the RAID control unit 111 in the CM 110 accesses the HDD 421 via the disk access control unit 212 in the CM 210. With such a configuration, both of the RAID control unit 111 and the disk access control unit 212 could detect errors when accessing the same HDD 421.

For example, the disk access control unit 212 detects data read errors, data write errors, spin-up failures of the HDD 421, media errors based on regular patrols on the HDD 421, or the like. Most of these errors are detected by the HDD 421 and reported to the CM 210, in response to a SCSI command transmitted to the HDD 421, for example. While the CM 210 that is directly connected to the DE 420 including the HDD 421 is able to detect these errors, the RAID control unit 111 that does not directly transmit a command to the HDD cannot detect these errors.

The RAID control unit 111 detects data read errors from the HDD 421. One example of the data read errors is an error detected when data is checked for its integrity. The data integrity check is processing for checking whether data is properly read from each of a plurality of HDDs constituting a logical volume while maintaining redundancy. In the case of RAID-1, whether identical data has been read from two HDDs is checked. In the case of RAID-5, first, data and parity information included in a stripe is read from corresponding HDDs, and whether parity information calculated from the data matches the read parity information is checked. Errors found in this data integrity check are detected only by the RAID-control CM but not by the DA-control CM.

In the present embodiment, as described above, a plurality of CMs detects errors when accessing a single HDD. Each of these CMs holds an error count that is incremented by a value corresponding to an error detected by the CM. Therefore, to cut off an HDD by using the error counts, one of the plurality of CMs needs to aggregate the error counts held in the respective CMs.

However, if a single CM aggregates the error counts, the following two problems occur.

(Problem 1) Since an error count is forwarded from one CM to another CM, the traffic on the transmission lines between the CMs is increased.

(Problem 2) The processing load on the CM that aggregates the error counts is increased. In some cases, the increased processing load could negatively affect the access performance of the CM in responding to requests from the host device 520.

Figure 6:
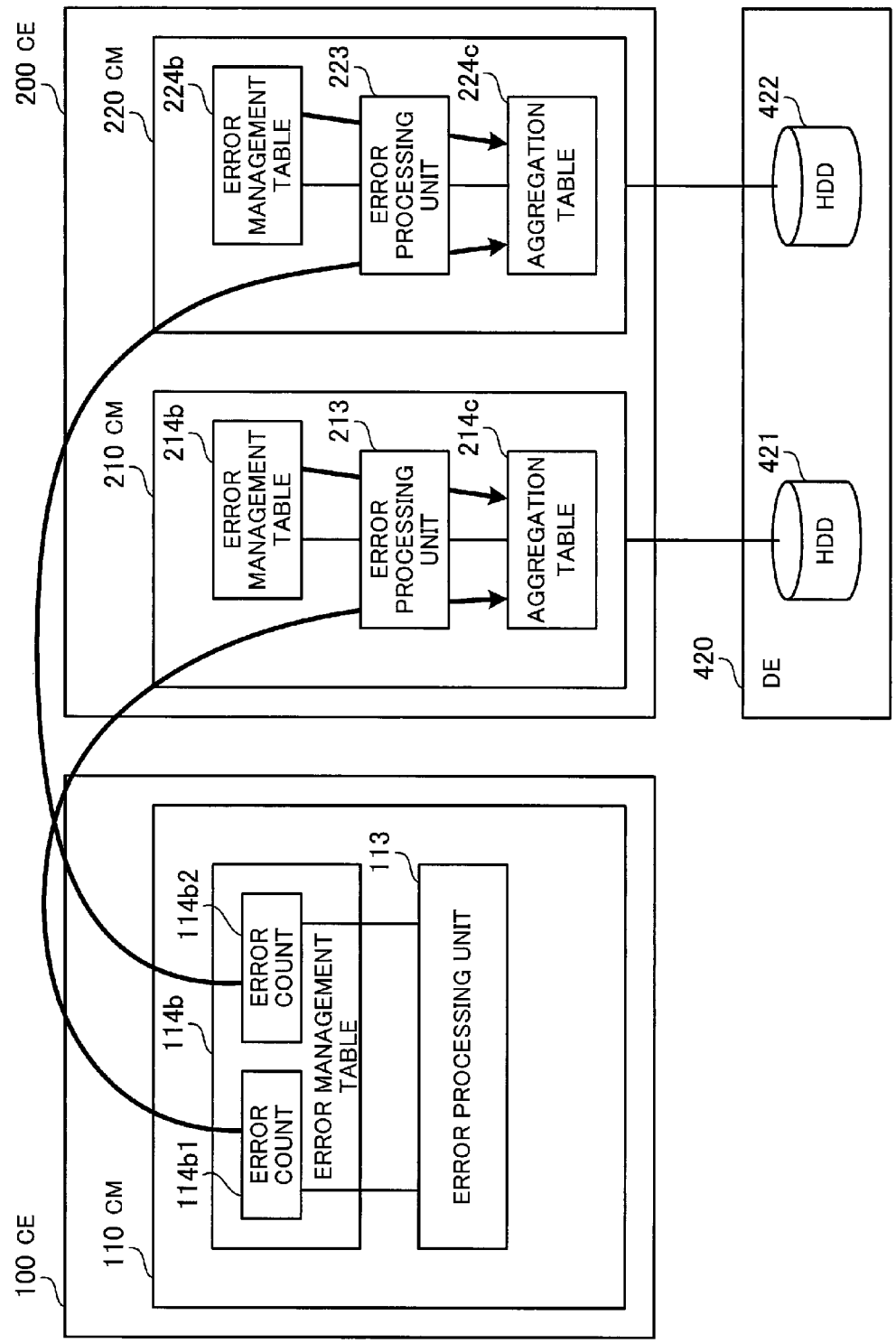
FIG. 6 illustrates an example of allocation of aggregation CMs that aggregate error counts.

In the present embodiment, to address these problems, the aggregation of the error counts is performed as illustrated in FIG. 6.

FIG. 6 illustrates an example of allocation of aggregation CMs that aggregate error counts. FIG. 6 illustrates how error counts are aggregated when the RAID control CM and the DA-control CMs are allocated with respect to the HDDs 421 and 422 as illustrated in FIG. 5.

The storage unit 114 in the CM 110 holds an error management table 114b in which error counts are stored. The error management table 114b holds error counts 114b 1 and 114b 2 corresponding to the HDDs 421 and 422, respectively. A storage unit in the CM 210 holds an error management table 214b in which an error count corresponding to the HDD 421 is stored. A storage unit in the CM 220 holds an error management table 224b in which an error count corresponding to the HDD 422 is stored.

When the RAID control unit 111 in the CM 110 accesses the HDD 421, if the error processing unit 113 in the CM 110 detects an error, the error processing unit 113 increments the error count 114b 1 in the error management table 114b by a value corresponding to the content of the error. When the RAID control unit 111 in the CM 110 accesses the HDD 422, if the error processing unit 113 in the CM 110 detects an error, the error processing unit 113 increments the error count 114b 2 in the error management table 114b by a value corresponding to the content of the error.

The CM 210 includes an error processing unit 213. When the disk access control unit 212 in the CM 210 accesses the HDD 421, if the error processing unit 213 detects an error, the error processing unit 213 increments the error count in the error management table 214b by a value corresponding to the content of the error.

The CM 220 includes an error processing unit 223. When the disk access control unit 222 in the CM 220 accesses the HDD 422, if the error processing unit 223 detects an error, the error processing unit 223 increments the error count in the error management table 224b by a value corresponding to the content of the error.

In this way, the error counts corresponding to the HDD 421 are separately stored in the error management tables 114b and 214b. In addition, the error counts corresponding to the HDD 422 are separately stored in the error management tables 114b and 224b. Therefore, the error counts per HDD need to be aggregated by one of the CMs corresponding to the HDD.

In the present embodiment, between the RAID-control CM and the DA-control CM for a certain HDD, the DA-control CM aggregates the error counts corresponding to the HDD and determines whether to cut off the HDD on the basis of the aggregation result. In this way, error counts are less frequently forwarded from the RAID-control CM to the DA-control CM, and an increase of the traffic on the transmission line between the CMs is prevented. Namely, effective measures against the above problem 1 is provided.

The reason why this positive effect is provided is that the RAID-control CM detects fewer errors than the DA-control CMs do. As described above, since the DA-control CMs directly transmit commands to their respective HDDs, the DA-control CMs are able to detect more kinds of errors that are transmitted in response to the commands. In contrast, the RAID-control CM is able to detect fewer kinds of errors, such as the above data read errors. Thus, by configuring the RAID-control CM, which detects errors less frequently, to forward error counts to the DA-control CMs, error counts are less frequently forwarded between the CMs.

In the example in FIG. 6, the CM 210 aggregates the error counts corresponding to the HDD 421, and the CM 220 aggregates the error counts corresponding to the HDD 422. More specifically, the storage unit in the CM 210 holds an aggregation table 214c used for aggregating the error counts. The error processing unit 113 in the CM 110 transmits the error count 114b 1 stored in the error management table 114b to the CM 210. The error processing unit 213 in the CM 210 calculates the aggregate value of the error count 114b 1 transmitted from the CM 110 and the error count stored in the error management table 214b and registers the aggregate value in the aggregation table 214c. If the aggregate value is above a predetermined threshold, the error processing unit 213 determines that the HDD 421 has malfunctioned and cuts off the HDD 421. As described above, since the CM 210 aggregates the error counts, error counts are less frequently forwarded between the CMs 110 and 210, compared with a case in which the CM 110 aggregates the error counts.

In addition, the storage unit in the CM 220 holds an aggregation table 224c used for aggregating error counts. The error processing unit 113 in the CM 110 transmits the error count 114b 2 stored in the error management table 114b to the CM 220. The error processing unit 223 in the CM 220 calculates the aggregate value of the error count 114b 2 transmitted from the CM 110 and the error count stored in the error management table 224b and registers the aggregate value in the aggregation table 224c. If the sum is above a predetermined threshold, the error processing unit 223 determines that the HDD 422 has malfunctioned and cuts off the HDD 422. As described above, the CM 220 aggregates the error counts. In this way, since the CM 220 aggregates the error counts, error counts are less frequently forwarded between the CMs 110 and 220, compared with a case in which the CM 110 aggregates the error counts.

In the configuration in FIG. 6, the CM 110 accesses the two HDDs 421 and 422. Thus, the CM 110 could aggregate the error counts corresponding to the HDDs 421 and 422. However, the CM 110 would need to perform both of the error-count aggregation operation and the cut-off control operation on each of the HDDs alone. Namely, the processing load on the CM 110 is increased.

In contrast, in the present embodiment, the DA-control CMs aggregate the error counts as described above. Namely, each of a plurality of CMs aggregates its corresponding error counts. As a result, the processing load caused by the error-count aggregation operation and the cut-off control operation is distributed among the CMs in the system. Thus, the processing load on each of the CMs is reduced. Namely, by causing each of the DA-control CMs to aggregate its corresponding error counts, effective measures against the above problem 2 is provided.

Next, a mechanism for further reducing the error count forwarding frequency will be described. As an example, transmission of an error count corresponding to the HDD 421 will be described. The error processing unit 113 in the RAID-control CM 110 compares the error count 114b 1 stored in the error management table 114b with a predetermined forwarding threshold. If the stored error count 114b 1 is above the forwarding threshold, the error processing unit 113 transmits the error count 114b 1 to the DA-control CM 210.

In this way, since the error counts are intermittently transmitted based on the forwarding threshold, the traffic on the transmission line between the CMs is reduced. In addition, if the stored error count is equal to or below the forwarding threshold, it is not likely that the HDD 421 has malfunctioned. Therefore, in many cases, the necessity for forwarding the error count to be aggregated is low. Namely, by causing the error processing unit 113 to compare the error count with the forwarding threshold and transmit the error count on the basis of the comparison result, it is possible to reduce the error count forwarding frequency while maintaining the accuracy of monitoring the status of the HDD.

In addition, the forwarding threshold compared with the error count can be changed depending to an instruction from the corresponding aggregation CM. More specifically, the forwarding threshold is lowered if more CMs have detected errors about the corresponding HDD. In this way, the larger the number of CMs that have detected errors is, the more frequently the error counts are forwarded. In this way, if there is a high possibility that an HDD has malfunctioned, the error counts are forwarded more frequently. As a result, the aggregation CM is allowed to determine whether the HDD has malfunctioned on the basis of an accurate aggregate value. Thus, it is possible to operate the storage system while maintaining an appropriate balance between the accuracy of monitoring the HDD statuses and the reduction of the traffic on the transmission lines.

Figure 9:
FIG. 9 illustrates an example of a configuration of an aggregation table.

Next, various kinds of information used in the processing performed by the CMs will be described. FIGS. 7 to 9 illustrate examples of table information stored in the storage unit 114 in the CM 110.

First, FIG. 7 illustrates an example of a configuration of a RAID management table 114a. The RAID management table 114a includes columns for RAID GROUP, MEMBER DISK, STATUS, RAID-CONTROL CM, DISK-ACCESS-CONTROL CM, and AGGREGATION CM.

The columns of a record in the RAID management table 114a will hereinafter be described. In a box under RAID GROUP, a number for identifying a RAID group set in the storage system is registered. In a box under MEMBER DISK, an identification number of an HDD allocated to the corresponding RAID group as a physical storage area is registered. In a box under STATUS, information indicating whether the corresponding member disk is properly operating is registered. For example, if the member disk is properly operating, "true" is registered in the box under STATUS. If the member disk has failed to operate properly and has been cut off from the RAID group, "false" is registered in the box under STATUS.

In a box under RAID-CONTROL CM, a number for identifying a RAID-control CM for the corresponding member disk is registered. In a box under DISK-ACCESS-CONTROL CM, a number for identifying a DA-control CM for the corresponding member disk is registered. In a box under AGGREGATION CM, an identification number of a CM that aggregates the error counts corresponding to the member disk is registered.

The other storage units in the CMs 120, 210, 220, 310, and 320 also hold respective RAID management tables, each of which includes the same set of columns as those in FIG. 7. In addition, all the RAID management tables in the CMs 110, 120, 210, 220, 310, and 320 are synchronized. Namely, if the content of the RAID management table in a certain CM is updated, all the other CMs are notified of the updated content, and the updated content is reflected in the RAID management tables in the other CMs.

FIG. 8 illustrates an example of a configuration of the error management table 114b. The error management table 114b includes columns for DISK NUMBER, ERROR COUNT, FORWARDING THRESHOLD, and CM HAVING DETECTED ERROR.

The columns of a record in the error management table 114b will hereinafter be described. In a box under DISK NUMBER, an identification number of an HDD is registered. The HDDs registered under DISK NUMBER are the HDDs that the CM (the CM 110) is able to access. More specifically, examples of these HDDs include HDDs on which the CM 110 performs RAID control and HDDs on which the CM 110 performs disk access control.

In a box under ERROR COUNT, an error count is registered. When the corresponding HDD is accessed, if an error is detected, the error count is incremented by a value corresponding to the content of the error. The initial value of the error count is 0. In a box under FORWARDING THRESHOLD, a threshold value for determining whether to forward the corresponding error count is registered. The initial value of the forwarding threshold is 0. In addition, the CM 110 is an aggregation CM of an HDD, this forwarding threshold is not used. Therefore, "NULL" is registered in the corresponding box under FORWARDING THRESHOLD.

In a box under CM HAVING DETECTED ERROR, an identification number of a CM is registered. If a CM has detected at least one error about the corresponding HDD (namely, a CM that has incremented the corresponding error count at least once), the CM is registered in this box. Examples of the CMs that could be registered under CM HAVING DETECTED ERROR include the RAID-control CM and the DA-control CM for the corresponding HDD. In addition, as will be described below, the content registered under CM HAVING DETECTED ERROR is synchronized by the RAID-control CM and DA-control CM for the corresponding HDD.

FIG. 9 illustrates an example of a configuration of the aggregation table 114c. The aggregation table 114c includes columns for DISK NUMBER, CUMULATIVE ERROR COUNT, and CUT-OFF THRESHOLD.

The columns of a record in the aggregation table 114c will hereinafter be described. In a box under DISK NUMBER, an identification number of an HDD is registered. The HDDs registered under DISK NUMBER are the HDDs for which the CM (the CM 110) serves as an error count aggregation CM. In a box under CUMULATIVE ERROR COUNT, a cumulative error count value for the corresponding HDD is registered. In a box under CUT-OFF THRESHOLD, a threshold value to be compared with the cumulative error count value is registered. The comparison is made for determining whether the corresponding HDD has malfunctioned. A predetermined value is set in the box under CUT-OFF THRESHOLD. A different cut-off threshold value may be set for each HDD, depending on the specifications or the date of the manufacture of the HDD, for example.

Next, the processing performed by a CM will be described with reference to the flowcharts.

Figure 10:
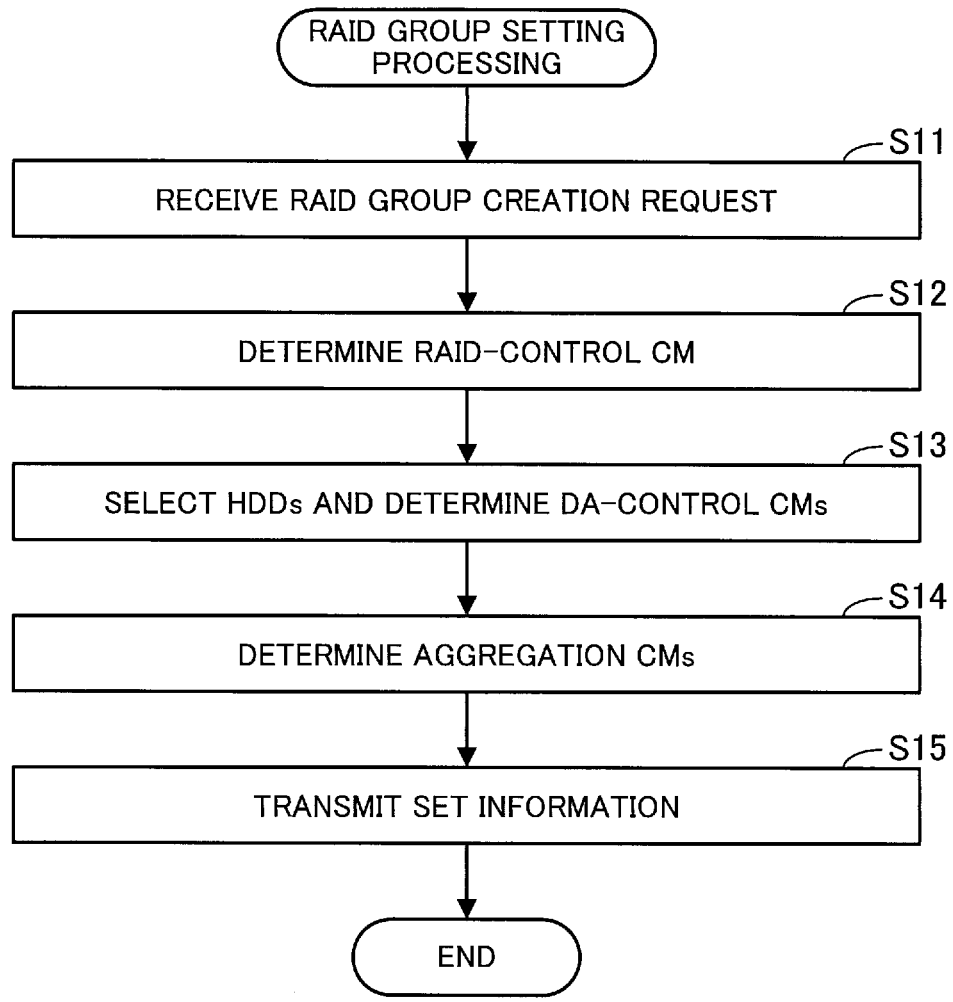
FIG. 10 is a flowchart illustrating an example of processing for setting a RAID group.

FIG. 10 is a flowchart illustrating an example of processing for setting a RAID group. The processing illustrated in FIG. 10 may be performed by any one of the CMs 110, 120, 210, 220, 310, and 320. As an example, the processing performed by the CM 110 will be described below. In addition, as an example, the following description will be made assuming that the CM 110 performs the processing in response to an operation input from the host device 520. However, alternatively, the processing may be performed in response to an operation input from a management terminal for managing the CMs 110, 120, 210, 220, 310, and 320, other than the host device 520.

[Step S11] The RAID control unit 111 receives a request to create a new RAID group from the host device 520. The host device 520 transmits this creation request in response to an operation input by a user to the host device 520.

[Step S12] The RAID control unit 111 determines a RAID-control CM for the new RAID group. For example, from among all the CMs, the RAID control unit 111 selects a CM that is assumed to be performing RAID control on a fewer number of HDDs and having lighter processing load. Alternatively, a RAID-control CM may be specified by an operation input on the host device 520.

[Step S13] From among the HDDs that have not been allocated to any of the RAID groups in the DEs 410, 420, and 430, the RAID control unit 111 selects HDDs that constitute the physical storage areas in the new RAID group. For example, the RAID control unit 111 receives information specifying the number of HDDs that constitute the physical storage areas of the new RAID group and selects the specified number of HDDs.

In addition, the RAID control unit 111 determines a DA-control CM for each of the selected HDDs. In the present embodiment, two CMs are connected to each of the DEs that includes a selected HDD. The RAID control unit 111 determines one of the two CMs to be a DA-control CM for the HDD. For example, the RAID control unit 111 selects CMs so that DA-control CMs are dispersedly allocated.

The RAID control unit 111 creates a record for each of the selected HDDs in the RAID management table 114a. The RAID control unit 111 registers the same identification number that indicates the new RAID group in the boxes under RAID GROUP in the respective created records. In addition, the RAID control unit 111 registers the identification number of the RAID-control CM determined in step S12 in the boxes under RAID-CONTROL CM in the respective records.

In addition, the RAID control unit 111 registers identification numbers of the selected HDDs in the boxes under MEMBER DISK in the respective records. The RAID control unit 111 sets "true" in the boxes under STATUS in the respective records. In addition, the RAID control unit 111 registers identification numbers of the determined DA-control CMs in the boxes under DA-CONTROL CM in the respective records.

[Step S14] The RAID control unit 111 determines an aggregation CM that aggregates error counts, for each of the HDDs selected in step S13. The aggregation CM and the DA-control CM are basically the same in each record. Therefore, after the RAID control unit 111 registers the identification number of the DA-control CM in the RAID management table 114a in step S13, the RAID control unit 111 copies and inserts the same number in the corresponding box under AGGREGATION CM.

[Step S15] The RAID control unit 111 transmits the information set in the RAID management table 114a through the above processing to the other CMs 120, 210, 220, 310, and 320. In this way, the contents in all the RAID management tables included in the CMs 110, 120, 210, 220, 310, and 320 are synchronized. Each of the CMs 110, 120, 210, 220, 310, and 320 refers to its own RAID management table held therein and recognizes whether it needs to perform RAID control on any RAID group or DA control on any HDD or serve as an aggregation CM for any HDD.

Figure 11:
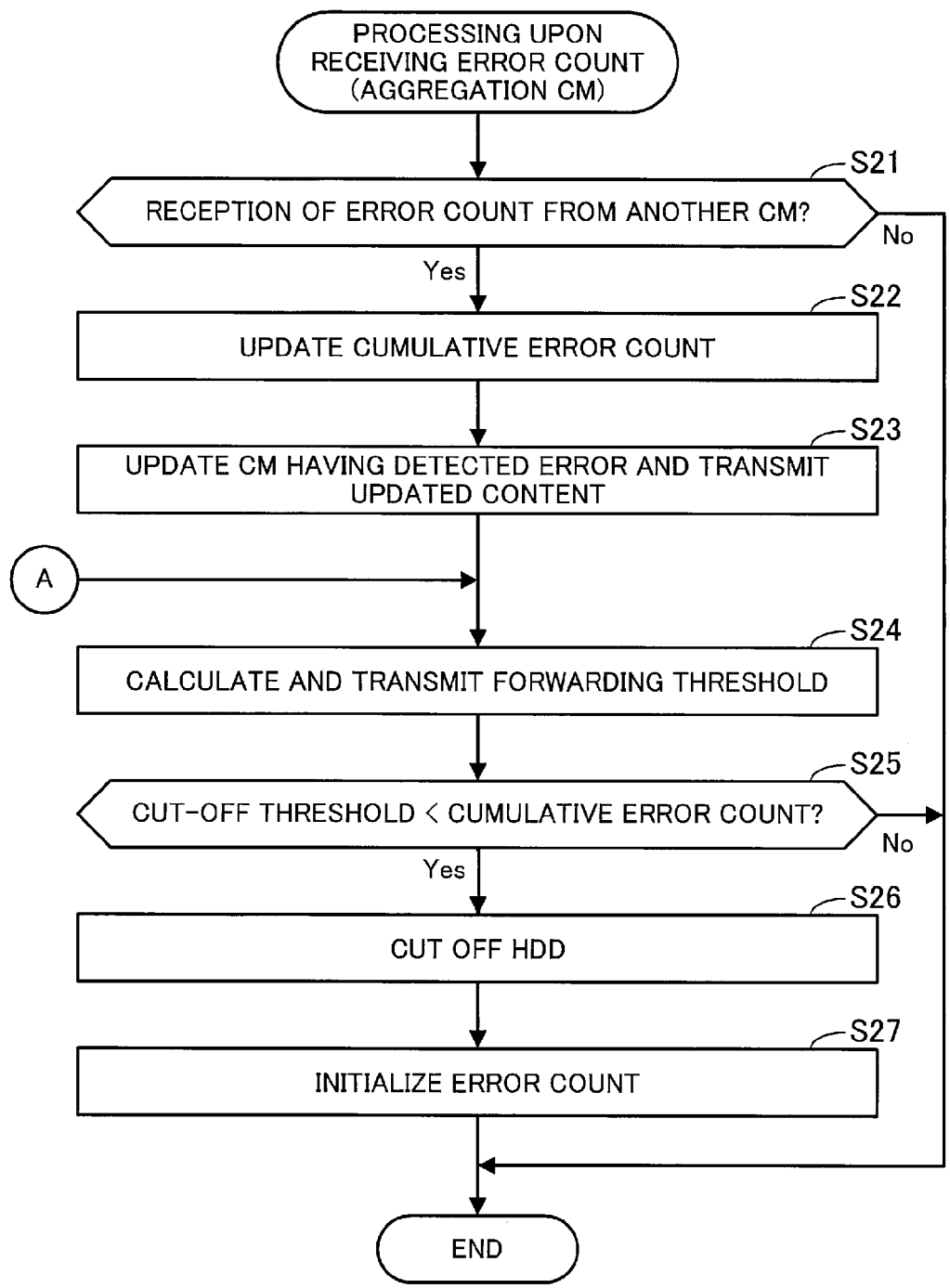
FIG. 11 is a flowchart illustrating an example of processing performed when an aggregation CM receives an error count.

FIG. 11 is a flowchart illustrating an example of processing performed when an aggregation CM receives an error count. As an example, the following description will be made assuming that the CM 110 serves as an error-count aggregation CM for an HDD and receives an error count corresponding to the HDD from another CM. For example, the processing in FIG. 11 is performed at certain time intervals.

[Step S21] The error processing unit 113 determines whether the CM 110 has received an error count corresponding to the HDD from another CM that performs RAID control on the HDD. If the CM 110 has received the error count, the processing proceeds to step S22. If not, the processing proceeds to END. For example, the identification number of the HDD is attached to the received error count. The error processing unit 113 refers to the attached identification number and determines the HDD corresponding to the received error count.

[Step S22] The error processing unit 113 refers to a record corresponding to the HDD in the aggregation table 114c. The error processing unit 113 increments the count registered in the corresponding box under CUMULATIVE ERROR COUNT in this record by the error count received in step S21. Namely, the error processing unit 113 updates the count registered in the corresponding box under CUMULATIVE ERROR COUNT with the incremented count.

[Step S23] The error processing unit 113 refers to a record corresponding to the HDD in the error management table 114b. If the identification number of the CM from which the CM 110 has received the error count in step S21 has not been registered in the corresponding box under CM HAVING DETECTED ERROR in this record, the error processing unit 113 adds the identification number in this record. The error processing unit 113 transmits the updated content of the record to the CM from which the CM 110 has received the error count in step S21. In this way, the record corresponding to the HDD in the error management table 114b in the CM 110 is synchronized with the record corresponding to the HDD in the error management table in the transmission destination CM.

In addition, transmission of the updated content of the record is not essential. However, by synchronizing the contents of the records through this transmission, for example, even if the operation of the CM 110 is halted, a forwarding threshold can be calculated by using the content of the record registered in the transmission destination CM.

[Step S24] The error processing unit 113 calculates a forwarding threshold for the HDD by using the following method. The error processing unit 113 reads the cumulative error count and the cut-off threshold from the record corresponding to the HDD in the aggregation table 114c. Hereinafter, the read cumulative error count and cut-off threshold are denoted by P and Th1, respectively. In addition, the error processing unit 113 refers to the record corresponding to the HDD in the error management table 114b and determines the number of CMs registered in the corresponding box under CM HAVING DETECTED ERROR. In this box, the number of CMs that have detected errors caused by the HDD is registered. Hereinafter, this number of CMs is denoted by C.

Assuming that the forwarding threshold for the HDD is Th2, the error processing unit 113 calculates the forwarding threshold Th2 in accordance with the following conditions 1 and 2.

(Condition 1) When P is smaller than Th1/C, Th2=Th1/C.

(Condition 2) When P is equal to or larger than Th1/C, Th2=0.

The error processing unit 113 transmits the calculated forwarding threshold Th2 to the CM from which the CM 110 has received the error count in step S21. The error processing unit in the CM that has received the transmitted forwarding threshold updates the forwarding threshold for the HDD registered in the error management table in the CM with the received forwarding threshold.

When the above condition 1 is met, the cumulative error count P is assumed to be sufficiently smaller than the cut-off threshold Th1. In this status, if the number C of CMs that have detected errors caused by the HDD is larger, a smaller value is set as the forwarding threshold Th2. Consequently, the larger the number C of CMs is, the more frequently the error counts are forwarded. As a result, the aggregation CM is able to determine whether to cut off the HDD on the basis of an accurate cumulative error count P. Namely, maintaining the accuracy of the cut-off determination and reducing the traffic on the transmission line is appropriately balanced. In addition, when the condition 2 is met, the cumulative error count P is assumed to have reached closer to the cut-off threshold Th1. In this status, each time an error is detected, the error count is forwarded. Namely, maintaining the accuracy of the cut-off determination is prioritized.

In addition, when the condition 2 is met, the forwarding threshold Th2 may be calculated by using an expression (Th1−P)/C, for example. In this case, under the condition 2, as the cumulative error count P reaches closer to the cut-off threshold Th1, the forwarding threshold Th2 is decreased further, compared with the condition 1. Namely, the accuracy of the cut-off determination is even more prioritized.

[Step S25] The error processing unit 113 determines whether the cumulative error count P is above the cut-off threshold Th1. If the cumulative error count P is above the cut-off threshold Th1, the processing proceeds to step S26. If not, the processing proceeds to END.

[Step S26] The error processing unit 113 determines that the HDD has malfunctioned and cuts off the HDD. More specifically, the error processing unit 113 updates the status of the record corresponding to the HDD in the RAID management table 114a with "false" and disables the HDD.

[Step S27] The error processing unit 113 initializes the error count of the record corresponding to the HDD in the error management table 114b to the initial value 0.

Figure 12:
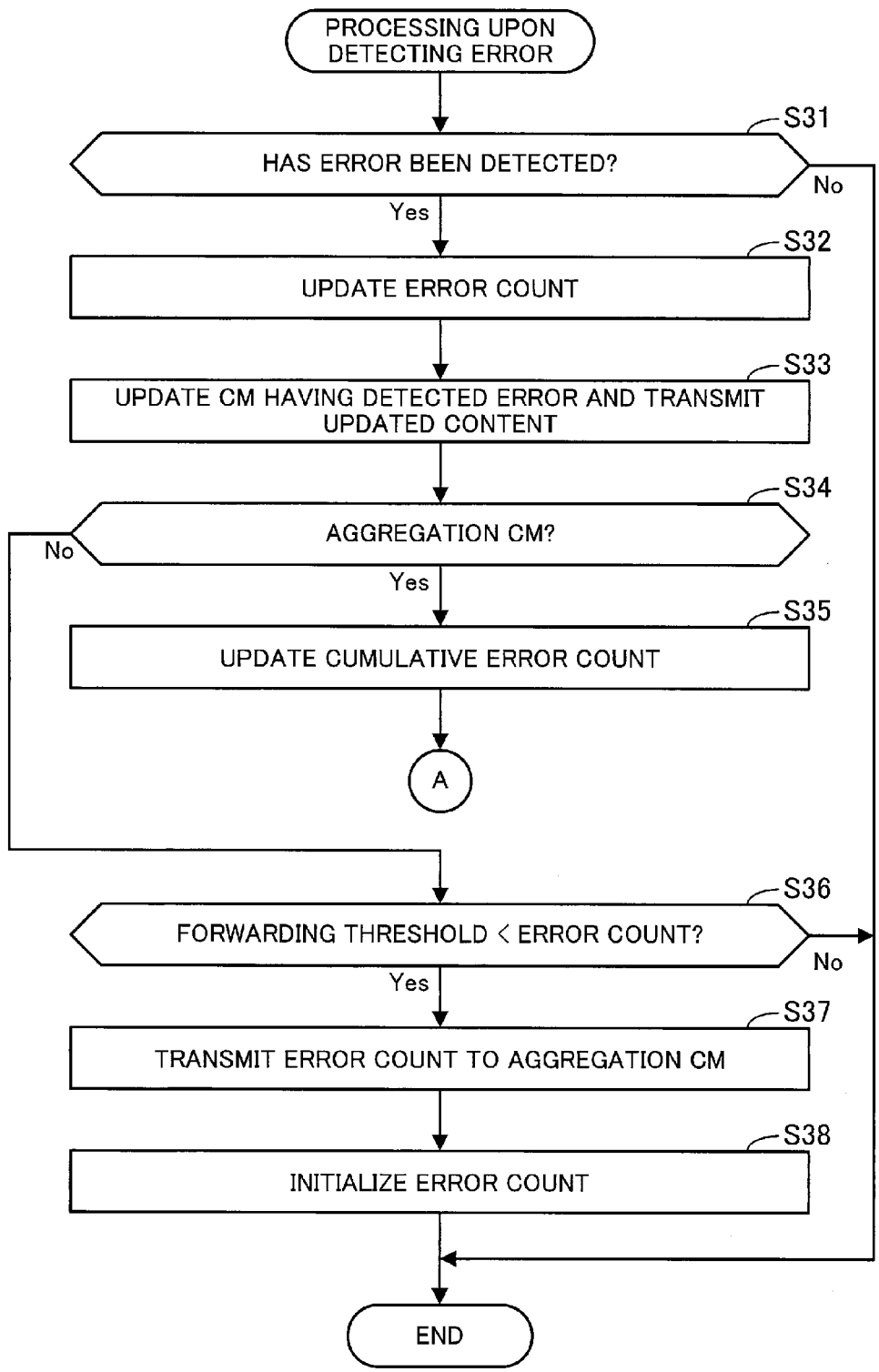
FIG. 12 is a flowchart illustrating an example of processing performed when an error is detected.

FIG. 12 is a flowchart illustrating an example of processing performed when an error is detected. The processing in FIG. 12 is performed by both the RAID-control CM and the DA-control CM for an HDD. As an example, the processing performed by the CM 110 will be described below. For example, the processing in FIG. 12 is performed at certain time intervals.

[Step S31] The error processing unit 113 determines whether the RAID control unit 111 or the disk access control unit 112 has detected an error on the HDD. If an error has been detected, the processing proceeds to step S32. If not, the processing proceeds to END.

[Step S32] The error processing unit 113 refers to the record corresponding to the HDD in the error management table 114b. The error processing unit 113 increments the count registered in the corresponding box under ERROR COUNT in this record by a value corresponding to the content of the error detected in step S31. Namely, the error processing unit 113 updates the count registered in the corresponding box under ERROR COUNT in this record with the incremented count.

[Step S33] The error processing unit 113 refers to the record corresponding to the HDD in the error management table 114b. If the identification number of the CM 110 has not been registered in the corresponding box under CM HAVING DETECTED ERROR in this record, the error processing unit 113 adds the identification number thereto.

The error processing unit 113 refers to the record corresponding to the HDD in the RAID management table 114a.

By referring to the information registered in the corresponding box under RAID-CONTROL CM or DA-CONTROL CM, the error processing unit 113 determines the CM to which the error processing unit 113 transmits the above updated content of the record in the error management table 114b. The error processing unit 113 transmits the above updated content of the record in the error management table 114b to the determined transmission destination CM. In this way, the record corresponding to the HDD in the error management table 114b in the CM 110 is synchronized with the record corresponding to the HDD in the error management table in the transmission destination CM.

In addition, if the CM 110 serves as the DA-control CM for the HDD, the error processing unit 113 does not need to transmit the updated content of the record.

[Step S34] On the basis of the information registered in the corresponding box under AGGREGATION CM in the record corresponding to the HDD in the RAID management table 114a, the error processing unit 113 determines whether the CM 110 serves as the aggregation CM that aggregates the error counts. If the CM 110 serves as the aggregation CM, the processing proceeds to step S35. If not, the processing proceeds to step S36.

[Step S35] The error processing unit 113 refers to the record corresponding to the HDD in the aggregation table 114c. The error processing unit 113 increments the count registered in the corresponding box under CUMULATIVE ERROR COUNT in this record by the value of the error count updated in step S32. Namely, the error processing unit 113 updates the count registered in the corresponding box under CUMULATIVE ERROR COUNT in this record with the incremented count.

When the processing in step S35 is completed, the processing proceeds to step S24 in FIG. 11.

[Step S36] The error processing unit 113 refers to the record corresponding to the HDD in the error management table 114b and compares the error count with the forwarding threshold registered in this record. If the error count is larger than the forwarding threshold, the processing proceeds to step S37. If the error count is equal to or below the forwarding threshold, the processing proceeds to END.

[Step S37] The error processing unit 113 refers to the record corresponding to the HDD in the RAID management table 114a and determines the aggregation CM for the HDD. The error processing unit 113 transmits the error count registered in the record that it has referred to in step S36 to the determined aggregation CM. In addition, in the processing in step S37, for example, the error count is transmitted with the identification number of the HDD.

[Step S38] The error processing unit 113 initializes the error count of the record corresponding to the HDD in the error management table 114b to the initial value 0.

Figure 13:
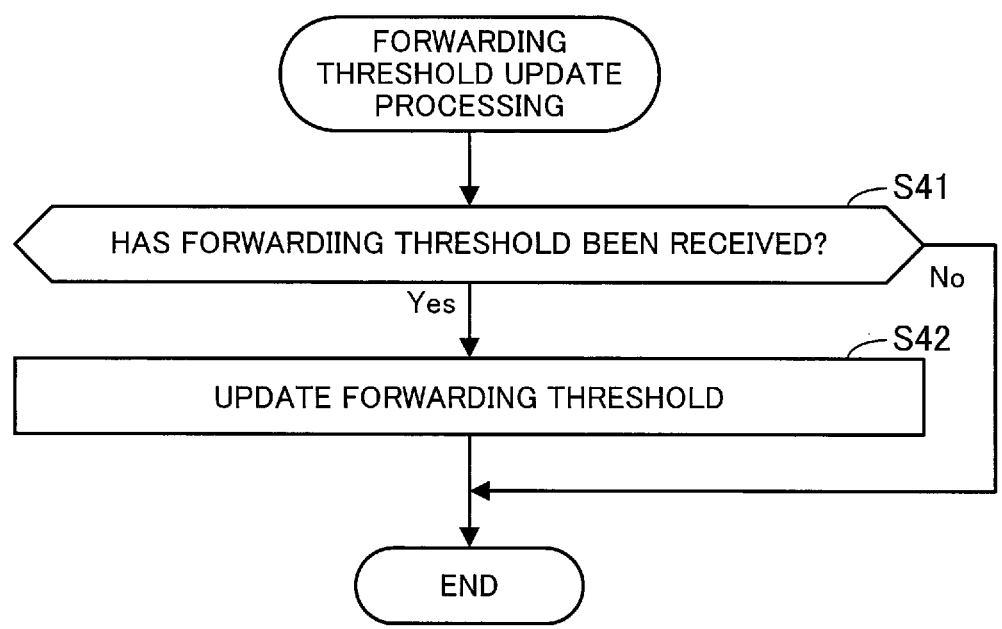
FIG. 13 is a flowchart illustrating an example of processing for updating a forwarding threshold.

FIG. 13 is a flowchart illustrating an example of processing for updating a forwarding threshold. The processing in FIG. 13 is performed by the RAID-control CM for an HDD. As an example, the processing performed by the CM 110 will be described below. For example, the processing in FIG. 13 is performed at certain time intervals.

[Step S41] The error processing unit 113 determines whether the CM 110 has received a forwarding threshold for the HDD from another CM that serves as the aggregation CM for the HDD. If the CM 110 has received the forwarding threshold, the processing proceeds to step S42. If not, the processing proceeds to END. For example, the error processing unit 113 receives the forwarding threshold along with the identification number of the HDD. On the basis of this identification number, the error processing unit 113 determines the HDD corresponding to the forwarding threshold.

[Step S42] The error processing unit 113 refers to the record corresponding to the HDD in the error management table 114*b*. The error processing unit 113 updates the forwarding threshold registered in this record with the forwarding threshold received in step S41.

In the second embodiment described above, a plurality of CMs could detect errors when a single HDD is accessed. In the storage system having such a configuration, by causing the DA-control CMs for respective HDDs to perform the error-count aggregation operation and the cut-off control operation, the traffic on the transmission lines among the CMs is reduced. In addition, the processing load is distributed among the CMs. Thus, the processing load on an individual CM is reduced.

In addition, the RAID-control CM transmits an error count when the error count is above the forwarding threshold. In this way, the error counts are less frequently transmitted. Thus, the traffic on the transmission lines among the CMs is reduced. In addition, the forwarding threshold is changed based on the number of CMs that have detected at least one error caused by the same HDD. In this way, the reduction of the traffic on the transmission lines among the CMs and the accuracy of the determination of malfunctions of the HDDs are appropriately balanced.

The processing functions of an individual device (for example, the control devices 10 and 20 and the CMs 110, 120, 210, 220, 310, and 320) described in the above embodiments may be realized by a computer. In this case, a program in which the processing contents corresponding to the functions of an individual device are written is provided. The processing functions are realized on the computer by causing the computer to execute the program. The program in which the processing contents are written may be recorded in a computer-readable recording medium. Examples of the computer-readable recording medium include a magnetic storage device, an optical disc, a magneto-optical recording medium, and a semiconductor memory. Examples of the magnetic storage device include a hard disk drive (HDD), a flexible disk (FD), and a magnetic tape. Examples of the optical disc include a digital versatile disc (DVD), a DVD-RAM, a compact disc read-only memory (CD-ROM), and a CD-R (Recordable)/RW (Rewritable). Examples of the magneto-optical recording medium include a magneto-optical disk (MO).

One way to distribute the program is to sell portable recording media such as DVDs or CD-ROMs in which the program is recorded. In addition, the program may be stored in a storage device of a server computer and forwarded to other computers from the server computer via a network.

For example, a computer that executes the program stores the program, which is recorded in the portable recording medium or forwarded from the server computer, in its storage device. Next, the computer reads the program from its storage device and performs processing in accordance with the program. The computer may directly read the program from the portable recording medium and perform processing in accordance with the program. In addition, each time the computer receives a program from the server computer connected via the network, the computer may perform processing in accordance with the received program.

According to one aspect, storage devices accessed by a plurality of control devices are managed in an integrated manner.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
a storage apparatus;
a first control apparatus; and
a second control apparatus,
wherein the first control apparatus includes:
a first memory configured to hold a first error count; and
a first processor configured to calculate the first error count, based on a status of an error detected when the storage apparatus is accessed via the second control apparatus, store the calculated first error count in the first memory, and transmit the first error count to the second control apparatus at predetermined timing, and
wherein the second control apparatus includes:
a second memory configured to hold a second error count; and
a second processor configured to calculate the second error count, based on a status of an error detected when the storage apparatus is accessed, store the calculated second error count in the second memory, and determine whether the storage apparatus has malfunctioned, based on an aggregate value of the first error count received from the first control apparatus and the second error count.

2. The storage system according to claim 1,
wherein the first memory also holds a forwarding threshold, and
wherein, when the first error count is above the forwarding threshold, the first processor transmits the first error count to the second control apparatus.

3. The storage system according to claim 2,
wherein, when a number of control apparatuses that have detected errors about the storage apparatus out of the first and second control apparatuses is larger, the second processor sets a smaller value as the forwarding threshold.

4. The storage system according to claim 3,
wherein, when the aggregate value is larger, the second processor sets a smaller value as the forwarding threshold.

5. A control apparatus for controlling access to a storage apparatus, the control apparatus comprising:
a memory configured to hold a first error count; and
a processor configured to perform a procedure including:
accessing the storage apparatus in response to an access request from another control apparatus;
calculating the first error count, based on a status of an error detected when the storage apparatus is accessed, and storing the calculated first error count in the memory;
receiving, from a different control apparatus, a second error count based on a status of an error detected when the different control apparatus accesses the storage apparatus via the control apparatus; and determining whether the storage apparatus has malfunctioned, based on an aggregate value of the first and second error counts.

6. A non-transitory computer-readable recording medium storing a control program that causes a computer serving as a control apparatus to perform a procedure comprising:
accessing a storage apparatus in response to an access request from a different control apparatus;
calculating a first error count, based on a status of an error detected when the storage apparatus is accessed, and storing the calculated first error count in a memory;
receiving, from the different control apparatus, a second error count based on a status of an error detected when the different control apparatus accesses the storage apparatus via the computer; and
determining whether the storage apparatus has malfunctioned, based an aggregate value of the first and second error counts.

* * * * *